United States Patent
Attig et al.

(10) Patent No.: US 8,160,092 B1
(45) Date of Patent: Apr. 17, 2012

(54) TRANSFORMING A DECLARATIVE DESCRIPTION OF A PACKET PROCESSOR

(75) Inventors: Michael E. Attig, San Jose, CA (US); Gordon J. Brebner, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 925 days.

(21) Appl. No.: 12/186,057

(22) Filed: Aug. 5, 2008

(51) Int. Cl.
   *H04L 12/43* (2006.01)
(52) U.S. Cl. .................................................. 370/458
(58) Field of Classification Search ................. None
   See application file for complete search history.

(56) References Cited

U.S. PATENT DOCUMENTS

| | | |
|---|---|---|
| 2002/0181500 A1 | 12/2002 | Higuchi et al. |
| 2004/0114589 A1 | 6/2004 | Alfieri et al. |
| 2005/0021871 A1 | 1/2005 | Georgiou et al. |
| 2005/0068981 A1 | 3/2005 | Park et al. |
| 2005/0120105 A1 | 6/2005 | Popescu et al. |
| 2006/0098689 A1 | 5/2006 | Stultz et al. |
| 2006/0114931 A1 | 6/2006 | Miyata |
| 2007/0055932 A1* | 3/2007 | Glein et al. ............ 715/526 |
| 2007/0220232 A1 | 9/2007 | Rhoades et al. |
| 2007/0237146 A1 | 10/2007 | Hadzic et al. |
| 2008/0126523 A1 | 5/2008 | Tantrum et al. |
| 2009/0037440 A1 | 2/2009 | Will et al. |

OTHER PUBLICATIONS

Paulin, P. G. et al.; *Force-Directed Scheduling in Automatic Data Path Synthesis*, Proc. of the 24th ACM/IEEE Conference on Design Automation (DAC), Jun. 28, 1987, pp. 195-202, ACM, New York, New York, USA.

Paulin, P.G. et al.; "Force-Directed Scheduling in Automatic Data Path Synthesis"; Proceedings of 24th ACM/IEEE Conference on Design Automation (DAC); Copyright 1987 ACM; pp. 195-202.

Soviani, Cristian et al.; "Synthesis of High-Performance Packet Processing Pipelines"; Proceedings of 43rd ACM/IEEE Conference on Design Automation; DAC 2006; Jul. 24-28, 2006; Copyright 2006 ACM; pp. 679-682.

Lee, Edward Ashford et al.; "Static Scheduling of Synchronous Data Flow Programs for Digital Signal Processing"; IEEE Trans. on Computers; Jan. 1987; Copyright 1987 IEEE; pp. 24-35.

Xilinx, Inc.; U.S. Appl. No. 12/186,078 by Attig et al.; filed Aug. 8, 2008.

Xilinx, Inc.; U.S. Appl. No. 12/186,099 by Attig et al.; filed Aug. 8, 2008.

Xilinx, Inc.; U.S. Appl. No. 12/186,428 by Attig et al.; filed Aug. 8, 2008.

(Continued)

*Primary Examiner* — Chirag Shah
*Assistant Examiner* — Minh-Trang Nguyen
(74) *Attorney, Agent, or Firm* — LeRoy D. Maunu (57) ABSTRACT

Methods are provided for transforming a declarative description of a processor of the packets of a communication protocol. A first declarative description of the packet processor is input. The first declarative description includes rules that include actions for manipulating the fields of the packets. Each rule includes one or more of the actions, and at least one of the rules includes multiple actions and a guard condition for enabling and disabling some of these actions. The first declarative description is transformed into a second declarative description of the packet processor. The second declarative description includes rules for manipulating the fields of the packets, and each rule corresponds to an action of a rule of the first declarative description. In addition, each individual action of each rule of the first declarative description corresponds to a rule of second declarative description that includes the individual action. The second declarative description is output.

20 Claims, 4 Drawing Sheets

OTHER PUBLICATIONS

U.S. Appl. No. 11/818,788, filed Jun. 14, 2007, Attig et al.
U.S. Appl. No. 11/818,811, filed Jun. 14, 2007, Attig et al.
U.S. Appl. No. 11/818,792, filed Jun. 14, 2007, Brebner.
U.S. Appl. No. 11/818,722, filed Jun. 14, 2007, Brebner et al.

* cited by examiner

TRANSFORMING A DECLARATIVE DESCRIPTION OF A PACKET PROCESSOR

FIELD OF THE INVENTION

The present invention generally relates to packet processors, and more particularly to processing the declarative description of a packet processor.

BACKGROUND

For packet-based communication protocols, packets communicate data and control information between devices via a communication network. Two communicating devices process the packets to transfer the data and control information between the devices. The communication network typically includes intermediate devices that transfer the packets between the two communicating devices, and the intermediate devices also process the packets.

It is difficult and time consuming to specify the packet processing performed by these devices. For example, it is difficult and time consuming to specify the required functionality of the packet processor together with timing characteristics such as throughput and latency. There is a general need to reduce the complexity of designing packet processors.

The present invention may address one or more of the above issues.

SUMMARY

Various embodiments of the invention provide methods of transforming a first declarative description of a processor of the packets of a communication protocol into a second declarative description of the processor of the packets. The first declarative description is input. The first declarative description includes rules that include actions for manipulating the fields of the packets. Each rule includes one or more of the actions, and at least one of the rules includes multiple actions and a guard condition for enabling and disabling some of these actions. The first declarative description is transformed into the second declarative description of the processor of the packets of the communication protocol. The second declarative description includes rules for manipulating the fields of the packets, and each rule corresponds to an action of a rule of the first declarative description. In addition, each individual action of each rule of the first declarative description corresponds to a rule of second declarative description that includes the individual action. The second declarative description is output.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION OF THE DRAWINGS

Figure 1:
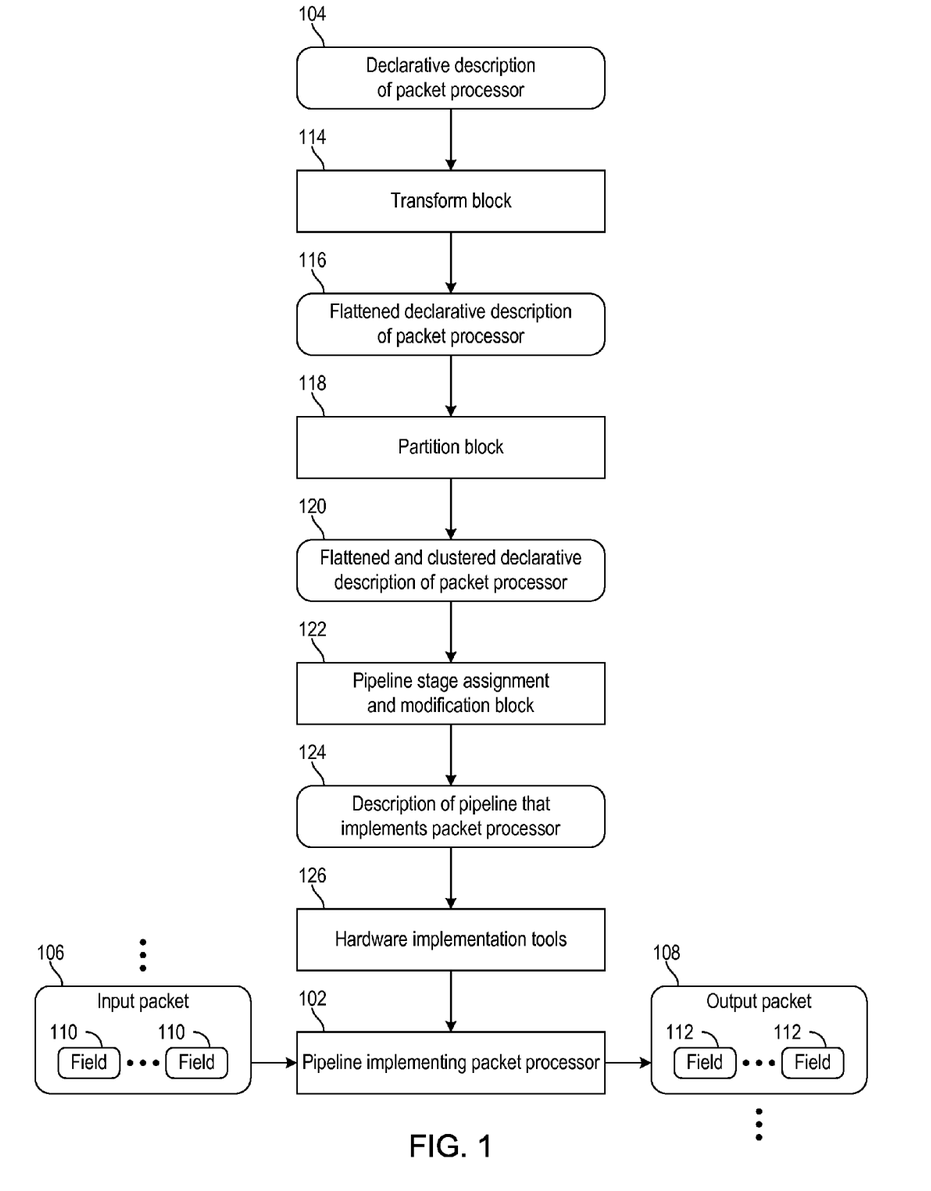
FIG. 1 is a dataflow diagram of a process for implementing and using a packet processor in accordance with various embodiments of the invention.

FIG. 1 is a dataflow diagram of a process for implementing and using a packet processor in accordance with various embodiments of the invention. The overall process generates a pipeline 102 for the packet processor from a declarative description 104 of the packet processor. The pipeline 102 receives input packets including input packet 106 and produces output packets including output packet 108. The pipeline 102 modifies input packet 106 to produce output packet 108 according to the declarative description 104, including modifying one or more of the fields 110 of the input packet 106 to produce the fields 112 of the output packet 108.

Transform block 114 flattens the rules of the declarative description 104 to produce the flattened declarative description 116 of the packet processor. The declarative description 104 includes sequences of rules for processing the input packets.

Each sequence of declarative description 104 is a sequence of one or more guarded rules. Each guarded rule in each sequence, except possibly a last guarded rule in each sequence, includes a guard condition and an action or another sequence that the guard condition enables and disables. The last guarded rule in each sequence optionally includes a guard condition and generally includes an action or another sequence that the optional guard condition enables and disables. For the first satisfied guard condition, if any, of the guarded rules within each sequence, the action or sequence of the guarded rule with this first satisfied guard condition is enabled, and the actions or sequences of the other guarded rules are disabled. If every guarded rule in a sequence has a guard condition and none of these guard conditions are satisfied, then every guarded rule in the sequence has a disabled action or sequence. If the last guarded rule in a sequence does not have a guard condition and none of the guard conditions of the other guarded rules in the sequence are satisfied, then the action or sequence of the last guarded rule is enabled, and the actions or sequences of the other guarded rules are disabled.

The flattened declarative description 116 includes guarded rules including an action and often including a guard condition for enabling and disabling the action, but the flattened declarative description 116 does not include any sequences of guarded rules. Alternatively, the flattened declarative description 116 is viewed to still include sequences, but each sequence is one guarded rule that is a last guarded rule including an action and an optional guard condition for enabling and disabling the action. Both the declarative description 104 and the flattened declarative description 116 are declarative descriptions of a same packet processor.

Example 1 below is an example of a declarative description of a sequence of two guarded rules and a last guarded rule without its optional guard condition. The guard conditions are included within square brackets and the actions are included within braces. The vertical bars indicate that the guarded rules are not separate guarded rules, but instead form a sequence of guarded rules. The sequence of guarded rules sets a field for the internet protocol address in a packet to an appropriate value based on a value of the version field of the packet.

Example 1

[ver=1]{ip=ip4}|[ver=2]{ip=ip6}|{ip=default}

Example 2 below shows the result of flattening Example 1 into three guarded rules according to various embodiments of the invention. Example 2 includes a corresponding guarded rule for each of the three actions within the sequence of Example 1.

Example 2

[ver=1]{ip=ip4}
[!(ver=1)&&(ver=2)]{ip=ip6}
[!(ver=1)&&!(ver=2)]{ip=default}

Partition block 118 separates the guarded rules of the flattened declarative description into clusters of independent guarded rules of the flattened and clustered declarative description 120 of the packet processor. Two guarded rules are dependent, for example, when one guarded rule defines data required by the other guarded rule. Guarded rules are independent, for example, when they have guard conditions that cannot be satisfied simultaneously. The three guarded rules in Example 2 are independent because their guard conditions are mutually exclusive. All of the guarded rules within each cluster are independent of each other, and any two or more mutually dependent guarded rules are in different clusters.

Stage assignment and modification block 122 orders the clusters of the flattened and clustered declarative description 120, and assigns each cluster to a stage of the pipeline 102 according to the order of the clusters. Block 122 also moves selected actions between stages to simplify the pipeline 102 in one embodiment. Block 122 generates a description 124 of a pipeline 102 that implements the packet processor. In one embodiment, the pipeline description 124 is an HDL description, such as a Verilog or VHDL description, of the pipeline 102.

Implementation tools 126 generate a hardware pipeline 102 implementing the packet processor specified by description 124. In one embodiment, implementation tools 126 generate configuration data for a programmable integrated circuit from an HDL description 124, and the programmable integrated circuit implements the hardware pipeline 102 after loading the configuration data. In another embodiment, implementation tools 126 are ASIC design tools that translate an HDL description 124 into a hardware pipeline 102 within an integrated circuit.

Figure 2:
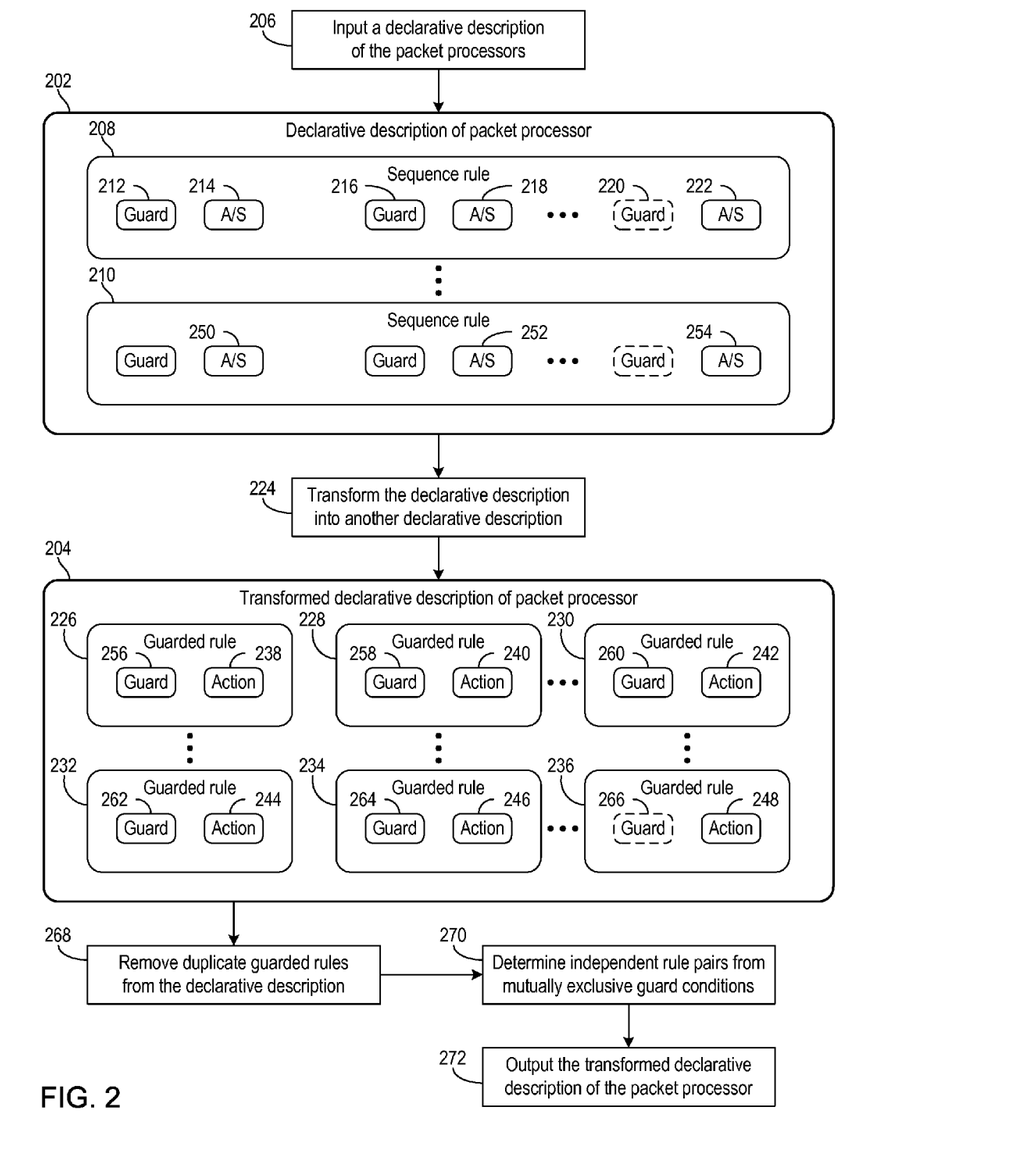
FIG. 2 is a dataflow diagram of a process for transforming a declarative description of a packet processor in accordance with various embodiments of the invention.

FIG. 2 is a dataflow diagram of a process for transforming a declarative description 202 of a packet processor in accordance with various embodiments of the invention. The sequences of declarative description 202 are transformed into a transformed declarative description 204 that is flattened to not include any sequences.

At step 206, the declarative description 202 of the packet processor is input. Declarative description 202 includes sequence rules 208 and 210. Sequence rule 208 includes a sequence of guarded rules, including the guarded rule composed of guard condition 212 and action-sequence 214, the guarded rule composed of guard condition 216 and action-sequence 218, and the last guarded rule of the sequence 208 composed of optional guard condition 220 and action-sequence 222. Sequence rule 210 includes a similar sequence of guarded rules.

If guard condition 212 is satisfied, then action-sequence 214 is enabled and action-sequences 218 and 222 are disabled. If guard condition 212 is not satisfied and guard condition 216 is satisfied, then action-sequence 218 is enabled and action-sequences 214 and 222 are disabled. If guard condition 212 and 216 are not satisfied and optional guard condition 220 is satisfied or omitted, then action-sequence 222 is enabled and action-sequences 214 and 218 are disabled. If guard condition 212 and 216 are not satisfied and optional guard condition 220 is present and not satisfied, then none of action-sequences 214, 218, and 222 are enabled.

Each action-sequence 214, 218, or 222 is either an action or a sequence rule. In one example, action-sequence 214 a set action for setting a value of a specified field of the packets, action-sequence 218 is an insert action for inserting data following a specified field of the packets, and action-sequence 222 is a delete action for deleting a specified field from the packets. If guard condition 212 is satisfied, then the set action of action-sequence 214 is enabled and performed. In another example, some of action-sequences 214, 218, or 222 recursively include another sequence of guarded rules, with some of these guarded rules recursively including additional sequences of guarded rules. In this example, action-sequence 250 a memory read action for a read access to a location in a memory, action-sequence 252 is a memory write action for write access to a location in a memory, and action-sequence 254 is a forward action for outputting a packet from the processor.

At step 224, the sequence rules of declarative description 202 are transformed into a declarative description 204 without any sequence rules. The transformed declarative description 204 includes guarded rules 226, 228, 230, 232, 234, and 236, but no sequences of guarded rules. Each action of declarative description 202 corresponds to one of actions 238, 240, 242, 244, 246, and 248 of transformed declarative description 204. In one example, all of action-sequences 214, 218, 222, 250, 252, and 254 are actions that respectively correspond to actions 238, 240, 242, 244, 246, and 248 of transformed declarative description 204. In addition, each of actions 238, 240, 242, 244, 246, and 248 of transformed declarative description 204 correspond to an action of declarative description 202. In summary, there is a one-to-one correspondence between actions of declarative description 202 and the actions of transformed declarative description 204.

Frequently, the guarded rules 226, 228, 230, 232, 234, and 236 of transformed declarative description 204 each include a respective guard condition 256, 258, 260, 262, 264, and 266. However, if a sequence rule of declarative description 202 is a sequence of a single guarded rule of an action without a guard condition, then transformed declarative description 204 includes a corresponding guarded rule 236 including the action 248 without any guard condition 266.

At step 268, any duplicate guarded rules are removed from the transformed declarative description 204 of the packet processor. For example, if guard condition 256 is equivalent to guard condition 262 and action 238 matches action 244, the duplicate guarded rule 232 is removed from transformed declarative description 204.

At step 270, pairs of guarded rules are determined that are independent because they have mutually exclusive guard conditions. For example, if guard conditions 256 and 258 cannot be satisfied simultaneously, then guarded rules 226 and 228 are independent, such that actions 238 and 240 can be performed concurrently without causing a conflict.

At step 272, the transformed declarative description 204 with the removed duplicate rules is output. In one embodiment, a listing or database of the remaining guarded rules 226, 228, 230, 232, 234, and 236 after removing duplicates is created in the memory of a computing system.

Figure 3:
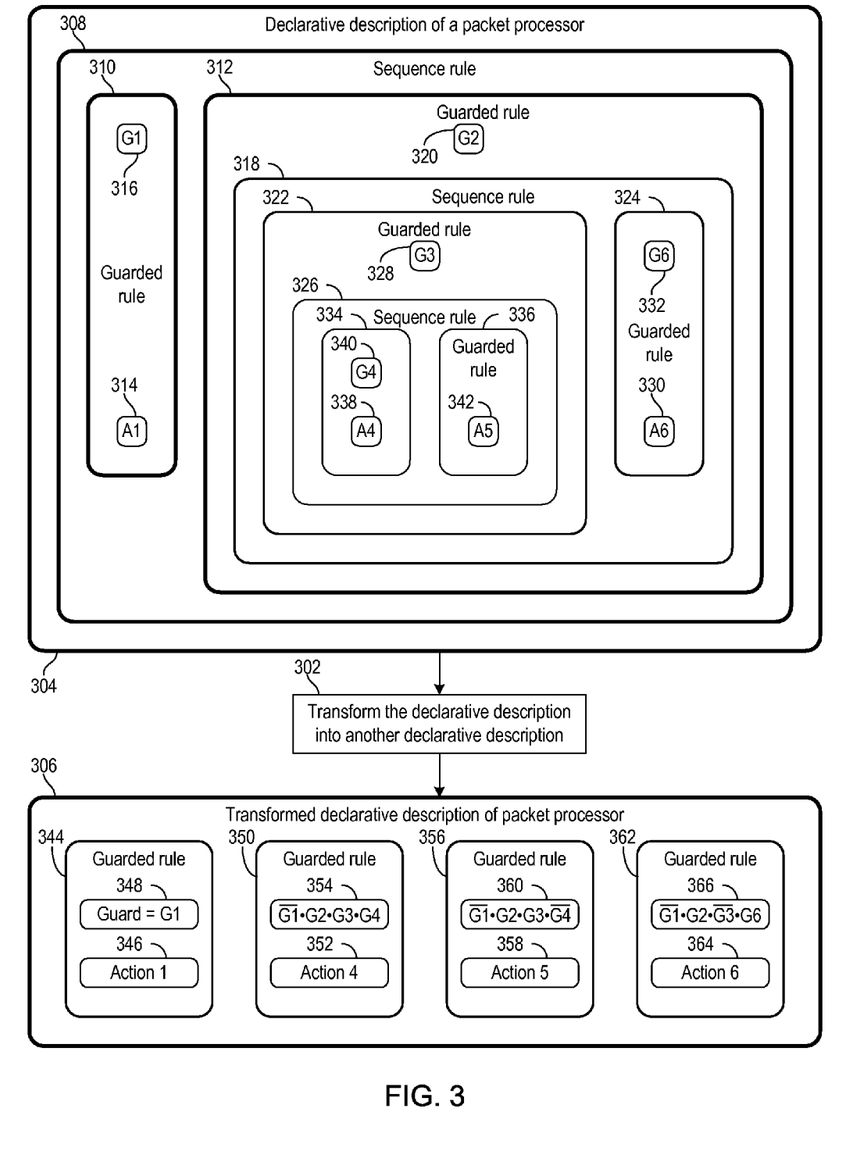
FIG. 3 is a dataflow diagram of a process for transforming a specific example of a declarative description of a packet processor in accordance with various embodiments of the invention.

FIG. 3 is a dataflow diagram of a process for transforming a specific example of a declarative description of a packet processor in accordance with various embodiments of the invention. At step 302, the declarative description 304 is flattened to remove the sequence rules and generate the transformed declarative description 306.

Declarative description 304 includes a sequence rule 308 of guarded rules 310 and 312. Guarded rule 310 includes an action 314 and a guard condition 316 for enabling and disabling the action 314. Guarded rule 312 recursively includes a sequence rule 318 and a guard condition 320 for enabling and disabling sequence rule 318. If guard condition 316 is satisfied, then action 314 is enabled and performed; otherwise, action 314 is disabled and not performed. When guard condition 320 of guarded rule 312 is satisfied and guard condition 316 of preceding guarded rule 310 is not satisfied, then sequence rule 318 is enabled. If guard condition 316 is satisfied or guard condition 320 is not satisfied, then sequence rule 318 is disabled.

Recursively included sequence rule 318 includes guarded rules 322 and 324. Guarded rule 322 includes a sequence rule 326 and a guard condition 328 for enabling and disabling sequence rule 326. Guarded rule 324 includes an action 330 and a guard condition 332 for enabling and disabling action 330. Sequence rule 326 is enabled when sequence rule 318 is enabled and guard condition 328 is satisfied; otherwise, sequence rule 326 is disabled. Action 330 of guarded rule 324 is enabled and performed when sequence rule 318 is enabled, guard condition 328 of preceding guarded rule 322 is not satisfied, and guard condition 332 is satisfied. Otherwise, action 330 is disabled and not performed.

Recursively included sequence rule 326 includes guarded rules 334 and 336. Guarded rule 334 includes an action 338 and a guard condition 340 for enabling and disabling action 338. Guarded rule 336 includes an action 342 and no guard condition. Action 338 is enabled and performed when sequence rule 326 is enabled and guard condition 340 is satisfied; otherwise, action 338 is disabled and not performed. Action 342 of guarded rule 336 is enabled and performed when sequence rule 326 is enabled and guard condition 340 of preceding guarded rule 334 is not satisfied; otherwise, action 342 is disabled and not performed.

The transformed declarative description 306 includes a guarded rule 344 that corresponds to action 314 of declarative description 304. Guarded rule 344 includes an action 346 and a guard condition 348 for enabling and disabling action 346. Action 346 of guarded rule 344 matches action 314 of declarative description 304. Guard condition 348 enables and disables action 346 under the same conditions that action 314 of declarative description 304 is enabled and disabled. Thus, guard condition 348 is equivalent to guard condition 316 of declarative description 304.

The transformed declarative description 306 includes a guarded rule 350 that corresponds to action 338 of declarative description 304. Guarded rule 350 includes an action 352 and a guard condition 354 for enabling and disabling action 352. Action 352 of guarded rule 350 matches action 338 of declarative description 304. Guard condition 354 enables and disables action 352 under the same conditions that action 338 of declarative description 304 is enabled and disabled. Thus, guard condition 354 is equivalent to guard condition 316 not being satisfied and guard conditions 320, 328, and 340 being satisfied. Alternatively, guard condition 354 is a conjunction of a negation of guard condition 316 and guard conditions 320, 328, and 340.

The transformed declarative description 306 includes a guarded rule 356 that corresponds to action 342 of declarative description 304. Guarded rule 356 includes an action 358 and a guard condition 360 for enabling and disabling action 358. Action 358 of guarded rule 356 matches action 342 of declarative description 304. Guard condition 360 enables and disables action 358 under the same conditions that action 342 of declarative description 304 is enabled and disabled. Thus, guard condition 360 is equivalent to guard condition 316 not being satisfied, guard conditions 320 and 328 being satisfied and guard condition 340 not being satisfied. Alternatively, guard condition 360 is a conjunction of negations of guard conditions 316 and 340 and guard conditions 320 and 328.

The transformed declarative description 306 includes a guarded rule 362 that corresponds to action 330 of declarative description 304. Guarded rule 362 includes an action 364 and a guard condition 366 for enabling and disabling action 364. Action 364 of guarded rule 362 matches action 330 of declarative description 304. Guard condition 366 enables and disables action 364 under the same conditions that action 330 of declarative description 304 is enabled and disabled. Thus, guard condition 366 is equivalent to guard condition 316 not being satisfied, guard condition 320 being satisfied, guard condition 328 not being satisfied, and guard condition 332 being satisfied. Alternatively, guard condition 366 is a conjunction of negations of guard conditions 316 and 328 and guard conditions 320 and 322.

There is a one-to-one correspondence between the actions 314, 338, 342, and 330 of declarative description 304 and respective guarded rules 344, 350, 356, and 362 and their actions 346, 352, 358, and 364 of the transformed declarative description 306.

Figure 4:
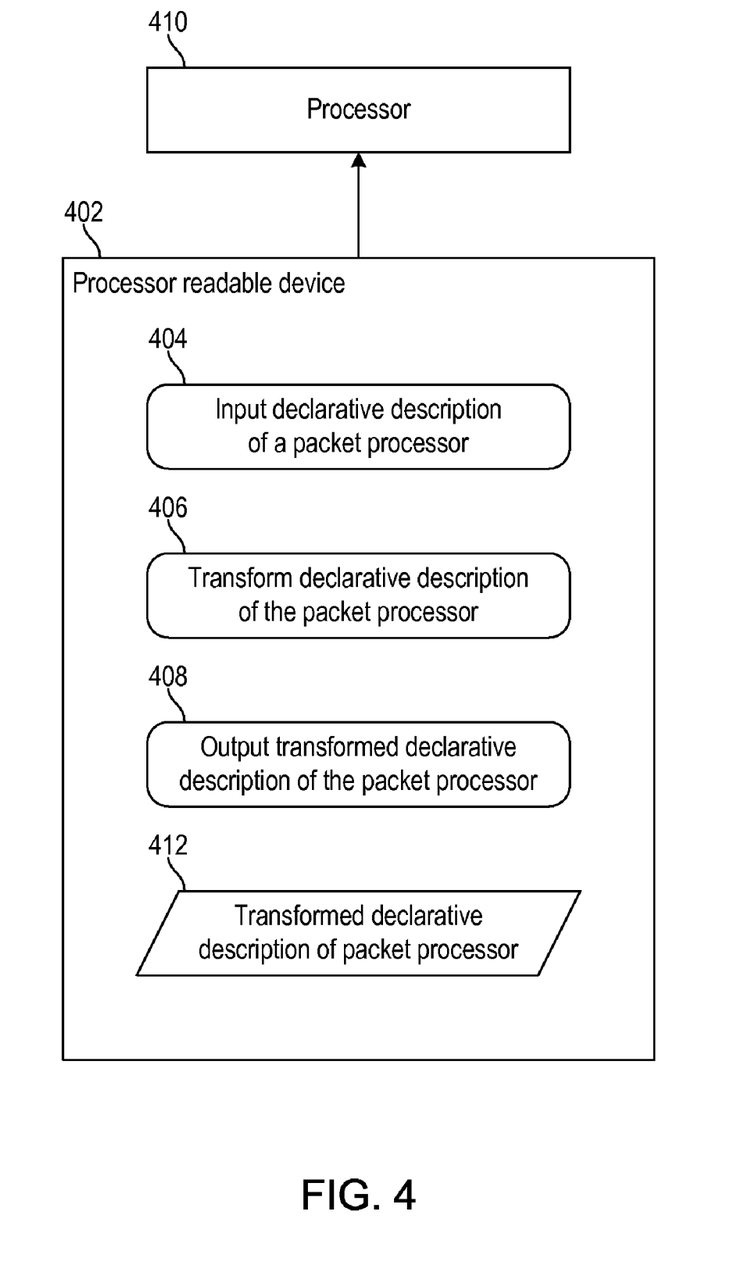
FIG. 4 is a block diagram of a system for transforming a declarative description of a packet processor in accordance with various embodiments of the invention.

FIG. 4 is a block diagram of a system for transforming a declarative description of a packet processor in accordance with various embodiments of the invention. Processor-readable device 402 is configured with software modules 404, 406, and 408 for transforming a first declarative description of a packet processor a second declarative description of the packet processor.

Execution of the instructions in software module 404 causes the processor 410 to input the first declarative description of the processor of the packets. The first declarative description includes rules that include actions for manipulating the fields of the packets. Each rule includes one or more of the actions, and one or more of the rules includes multiple actions and a guard condition for enabling and disabling some of these actions.

Execution of the instructions in software module 406 causes the processor 410 to transform the first declarative description into the second declarative description of the packet processor. The second declarative description includes rules for manipulating the fields of the packets. Each rule corresponds to an action of a rule of the first declarative description. Each action of each rule of the first declarative description corresponds to a rule of the second declarative description that includes the action of the rule of the first declarative description.

Execution of the instructions in software module 408 causes the processor 410 to output the second declarative description of the packet processor. In one embodiment, the second declarative description 412 is output to a memory, such as processor readable device 402

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

The present invention is thought to be applicable to a variety of systems for transforming a declarative description of a packet processor for processing the packets of a communication protocol. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method of transforming a first declarative description of a processor of packets into a second declarative description of the processor of the packets, comprising:
inputting the first declarative description of the processor of the packets of a communication protocol, the first declarative description including a first plurality of rules that includes a plurality of actions for manipulating a plurality of fields of the packets, each rule including at least one of the actions, and at least one of the rules including a plurality of the actions and a guard condition for enabling and disabling at least one action in the plurality;
transforming the first declarative description into the second declarative description of the processor of the packets of the communication protocol, the second declarative description including a second plurality of rules for manipulating the fields of the packets, each rule in the second plurality corresponding to an action of a rule in the first plurality, and each action of each rule in the first plurality corresponding to a rule in the second plurality, the rule in the second plurality including the action of the rule in the first plurality; and
outputting the second declarative description of the processor of the packets of the communication protocol.

2. The processor-implemented method of claim 1, wherein the plurality of actions include one of: a set action for setting a value of a specified one the fields of the packets, an insert action for inserting data following a specified one of the fields of the packets, a delete action for deleting a specified one of the fields from the packets, a memory access action for accessing a location in a memory, or a forward action for outputting a packet from the processor.

3. The processor-implemented method of claim 1, wherein:
the first declarative description declares the rules in the first plurality without specifying an order of performing the actions; and
the second declarative description declares the rules in the second plurality without specifying an order of performing the actions.

4. The processor-implemented method of claim 1, wherein the transforming of the first declarative description into the second declarative description further includes removing a first rule from the second plurality in response to the first rule matching a second rule in the second plurality, the first and second rules matching in response to the first and second rules including matching respective actions and equivalent respective guard conditions for enabling and disabling the respective actions.

5. The processor-implemented method of claim 1, further comprising determining whether the two actions in each pair of the rules in the second plurality are independent in response to the pair of rules having respective guard conditions that cannot be satisfied simultaneously.

6. The processor-implemented method of claim 1, wherein:
each rule in the first plurality comprises a first sequence of a plurality of guarded-rules;
each guarded-rule of the first sequence and a recursive second sequence includes one of an action or the recursive second sequence of a plurality of guarded-rules; and
each guarded-rule of the first and recursive second sequences also includes a guard condition for enabling and disabling the one of the action or the recursive second sequence.

7. The processor-implemented method of claim 6, wherein each action of each one of the guarded-rules of each one of the first and recursive second sequences is enabled in response to the guard condition being satisfied for the one of the guarded-rules and the guard condition being satisfied for each sequence recursively included in the one sequence, and the guard condition not being satisfied for each guarded-rule preceding the one of the guarded-rules in the one sequence and the guard condition not being satisfied for each guarded-rule preceding each sequence recursively included in the one sequence.

8. The processor-implemented method of claim 6, wherein each action of each one of the guarded-rules of each of the first and recursive second sequences is enabled in response to the guard condition of the one of the guarded-rules being satisfied and the guard condition not being satisfied for each guarded-rule preceding the one of the guarded-rules in the sequence.

9. The processor-implemented method of claim 8, wherein:
the transforming of the first declarative description into the second declarative description includes generating the rule in the second plurality that includes the action of the one of the guarded-rules of the sequence: and
the rule also includes a guard condition for enabling and disabling the action, the guard condition being a conjunction of the guard condition of the one of the guarded-rules and a negation of the guard condition for each guarded-rule preceding the one of the guarded-rules in the sequence.

10. The processor-implemented method of claim 9, wherein:
the first declarative description declares the rules in the first plurality without specifying an order of performing the actions;
the second declarative description declares the rules in the second plurality without specifying an order of performing the actions; and
the actions include one of a set action for setting a value of a specified one the fields of the packets, an insert action for inserting data following a specified one of the fields of the packets, a delete action for deleting a specified one of the fields from the packets, a memory access action for accessing a location in a memory, or a forward action for outputting a packet from the processor.

11. The processor-implemented method of claim 10, further comprising determining whether the two actions in each pair of the rules in the second plurality are independent in response to the pair of rules having respective guard conditions that cannot be satisfied simultaneously.

12. The processor-implemented method of claim 11, wherein the transforming of the first declarative description into the second declarative description further includes removing a first rule from the second plurality in response to the first rule matching a second rule in the second plurality, the first and second rules matching in response to the first and second rules including matching respective actions and equivalent respective guard conditions for enabling and disabling the respective actions.

13. The processor-implemented method of claim 1, wherein:
each rule in the first plurality comprises a first sequence of at least one guarded-rule;

each guarded-rule of the first sequence and a recursive second sequence including one of an action or the recursive second sequence of at least one guarded-rule; and each guarded-rule other than a respective last guarded-rule of the first and recursive second sequences also includes a guard condition for enabling and disabling the one of the action or the recursive second sequence.

14. The processor-implemented method of claim 13, wherein:
each rule in the first plurality comprises the first sequence of a plurality of guarded-rules; and
each guarded-rule of the first sequence and the recursive second sequence includes one of an action or the recursive second sequence of a plurality of guarded-rules.

15. The processor-implemented method of claim 13, wherein the respective last guarded-rule of the first and recursive second sequences also includes a guard condition for enabling and disabling the one of the action or the recursive second sequence.

16. The processor-implemented method of claim 15, wherein each action of each one of the at least one guarded-rule of each of the first and recursive second sequences is enabled in response to the guard condition of the one guarded-rule being satisfied and the guard condition not being satisfied for each guarded-rule preceding the one guarded-rule in the sequence.

17. The processor-implemented method of claim 13, wherein each action of each one of the at least one guarded-rule, excepting the respective last guarded-rule, of each of the first and recursive second sequences is enabled in response to the guard condition of the one guarded-rule being satisfied and the guard condition not being satisfied for each guarded-rule preceding the one guarded-rule in the sequence.

18. The processor-implemented method of claim 17, wherein:
the transforming of the first declarative description into the second declarative description includes generating the rule in the second plurality that includes the action of the one guarded-rule of the sequence; and
the rule also includes a guard condition for enabling and disabling the action, the guard condition being a conjunction of the guard condition of the one guarded-rule and a negation of the guard condition for each guarded-rule preceding the one guarded-rule in the sequence.

19. A non-transitory program storage medium, comprising:
instructions executed by a processor device for transforming a first declarative description of a processor of packets into a second declarative description of the processor of the packets, wherein execution of the instructions by at least one processor causes the at least one processor to perform operations including,
inputting the first declarative description of the processor of the packets, the first declarative description including a first plurality of rules that include a plurality of actions for manipulating a plurality of fields of the packets, each rule including at least one of the actions, and at least one of the rules including a plurality of the actions and a guard condition for enabling and disabling at least one action in the plurality,
transforming the first declarative description into the second declarative description of the processor of the packets, the second declarative description including a second plurality of rules for manipulating the fields of the packets, each rule in the second plurality corresponding to an action of a rule in the first plurality, and each action of each rule in the first plurality corresponding to a rule in the second plurality, the rule in the second plurality including the action of the rule in the first plurality, and
outputting the second declarative description of the processor of the packets.

20. A system for transforming a first declarative description of a processor of packets into a second declarative description of the processor of the packets, comprising:
means for inputting the first declarative description of the processor of the packets, the first declarative description including a first plurality of rules that include a plurality of actions for manipulating a plurality of fields of the packets, each rule including at least one of the actions, and at least one of the rules including a plurality of the actions and a guard condition for enabling and disabling at least one action in the plurality;
means for transforming the first declarative description into the second declarative description of the processor of the packets, the second declarative description including a second plurality of rules for manipulating the fields of the packets, each rule in the second plurality corresponding to an action of a rule in the first plurality, and each action of each rule in the first plurality corresponding to a rule in the second plurality, the rule in the second plurality including the action of the rule in the first plurality; and
means for outputting the second declarative description of the processor of the packets.

* * * * *